United States Patent
Dobre

(10) Patent No.: US 9,454,312 B2
(45) Date of Patent: Sep. 27, 2016

(54) METHOD AND SYSTEM FOR STORING AND READING DATA IN OR FROM A KEY VALUE STORAGE

(75) Inventor: Dan Dobre, Heidelberg (DE)

(73) Assignee: NEC CORPORATION, Tokyo (JP)

( * ) Notice: Subject to any disclaimer, the term of this patent is extended or adjusted under 35 U.S.C. 154(b) by 492 days.

(21) Appl. No.: 14/131,514

(22) PCT Filed: Jul. 6, 2012

(86) PCT No.: PCT/EP2012/063322
§ 371 (c)(1),
(2), (4) Date: Jan. 8, 2014

(87) PCT Pub. No.: WO2013/152812
PCT Pub. Date: Oct. 17, 2013

(65) Prior Publication Data
US 2014/0143369 A1 May 22, 2014

(51) Int. Cl.
*G06F 11/00* (2006.01)
*G06F 3/06* (2006.01)
*G06F 11/18* (2006.01)
(Continued)

(52) U.S. Cl.
CPC .............. *G06F 3/0617* (2013.01); *G06F 3/067* (2013.01); *G06F 3/0646* (2013.01); *G06F 11/186* (2013.01); *G06F 11/2094* (2013.01); *G06F 11/0709* (2013.01); *G06F 11/1076* (2013.01); *G06F 11/1092* (2013.01);
(Continued)

(58) Field of Classification Search
CPC ........... G06F 11/0709; G06F 11/1076; G06F 11/1092; G06F 11/1474; G06F 11/2089; G06F 11/2904
See application file for complete search history.

(56) References Cited

U.S. PATENT DOCUMENTS

2001/0039630 A1  11/2001  Kursawe et al.
2004/0161110 A1*  8/2004  Kanai ................. H04L 63/0442
                                                                380/279
(Continued)

FOREIGN PATENT DOCUMENTS

JP  2003121659 A  4/2003

OTHER PUBLICATIONS

International Search Report dated Feb. 19, 2013, corresponding to PCT/EP2012/063322.
(Continued)

*Primary Examiner* — Charles Ehne
(74) *Attorney, Agent, or Firm* — Young & Thompson

(57) ABSTRACT

A method and system for storing data in a key value storage having a plurality of n servers, wherein $t<n$ servers may fail arbitrarily and wherein $3t+1=n$ is satisfied, the method includes:
a) generating commitment information for a secret information,
b) disseminating a first message including the data to be stored, a corresponding key for the data and the generated commitment information to the n servers,
c) storing the information included in the first message on at least a number of servers,
d) providing first storing confirmation information by at least n-t servers,
e) disseminating a second message including corresponding key and the secret information to the n servers,
f) storing the information included in the second message, and
g) providing second storing confirmation information by at least n-t servers.

17 Claims, 2 Drawing Sheets

(51) Int. Cl.
*G06F 11/20* (2006.01)
*G06F 11/14* (2006.01)
*G06F 11/10* (2006.01)
*G06F 11/07* (2006.01)

(52) U.S. Cl.
CPC ...... *G06F 11/1474* (2013.01); *G06F 2201/82* (2013.01); *G06F 2201/835* (2013.01)

(56) References Cited

U.S. PATENT DOCUMENTS

| | | |
|---|---|---|
| 2010/0106974 A1 | 4/2010 | Aguilera et al. |
| 2010/0180116 A1 | 7/2010 | Coan et al. |
| 2011/0010547 A1* | 1/2011 | Noda .................. G06F 21/445 713/168 |
| 2012/0117067 A1 | 5/2012 | Yakubovich et al. |

OTHER PUBLICATIONS

Dan Dobre, et al.; "Efficient Robust Storage Using Secret Tokens"; Nov. 3, 2009; pp. 269-283.

Amitanand S. Aiyer, et al.; "Bounded Wait-Free Implementation of Optimally Resilient Byzantine Storage Without (Unproven) Cryptographic Assumptions"; Sep. 24, 2007; pp. 7-19.

B. Liskov, et al; "Tolerating Byzantine Faulty Clients in a Quorum System"; Jul. 4, 2006; pp. 34-34.

Kazuyuki Shudo, "A Key-Value Store Course (Introduction): Tailored to Users in Real Need of Key-Value Store", Software Design, Gijutsu-Hyohron Co., Ltd., Japan, Feb. 18, 2010, No. 232, pp. 14-21.

Yusuke Matsumoto, Hiroshi Kobayashi, "A Speculative Byzantine Algorithm for P2P System", FIT2010 (Forum on Information Technology 2010), IEICE and IPSJ, Japan, Aug. 20, 2010, vol. 1, pp. 441-444.

* cited by examiner

METHOD AND SYSTEM FOR STORING AND READING DATA IN OR FROM A KEY VALUE STORAGE

The present invention relates to a method for storing data in a key value storage having a plurality of n servers, wherein t<n servers may fail arbitrarily and wherein 3t+1=n is satisfied.

The present invention further relates to a method for reading data stored in a key value storage having a plurality of n servers, wherein t<n servers may fail arbitrarily and wherein 3t+1=n is satisfied.

The present invention further relates to a system for storing data in a key value storage having a plurality of n servers, wherein t<n servers may fail arbitrarily and wherein 3t+1=n is satisfied and a writer for writing data into the key value storage, preferably for performing the method according to one of the claims 1-15.

The present invention further relates to a system for reading data stored in a key value storage having a plurality of n servers wherein t<n servers may fail arbitrarily and wherein 3t+1=n is satisfied and a reader for reading data stored in the key value storage, preferably for performing a method to one of the claims 1-15.

Key value storages, also called key value stores (KVS) are getting an increasing interest for various large scale distributed systems ranging from databases, search engines, cloud-based platforms, for example cloud programming frameworks like map-reduce, to collaborative applications like social networks. For instance conventional storage databases often implement search indexes on top of a distributed key value store for scalability and performance. Key value stores can not only serve as a storage layer for higher level layers, but also may serve applications directly such as in peer-to-peer filesharing. If one or more of the storage servers crash for example due to a software error or hardware failure or the like, the key value store shall compensate such a failure. Key value stores like Cassandra, Redis, HBase, Dynamo and Memcached tolerate failure or crashes of storage servers by employing replication.

One desirable feature of key value stores is to ensure data consistency and availability even in the case that concurrent access by different users is performed. The highest degree of data consistency is the so called atomic consistency, meaning that if a certain value is stored under a certain key or a read operation returns the value, then every subsequent read operation returns the corresponding value v or a newer value v' but never a value which is older than v. Conventional key value stores support atomic consistency at the level of single keys and transactional access to multiple keys is performed in higher level layers. For many applications atomic consistency is mandatory.

Availability is complementary to consistency, i.e. if a client, which is assumed to be a correct client of the key value store, invokes a read or write operation then the operation should be successful despite of faulty servers and irrespective of the behavior of other potentially faulty clients.

For an increasing number of applications and systems, relying on a key value store as a core storage layer, robustness of the key value store is also important. However, due to the increasing complexity of distributed systems, consisting of a large number of interconnected nodes, the probability that some node fails is increasing. The risk of such accidental hardware and software faults, for example software bugs, also increase significantly reducing robustness of the key value store. A further emerging risk are exploited vulnerabilities: Due to the advent of cloud computing, data is outsourced to cloud serving platforms which are directly accessible from the internet. One of the consequences are exploitable vulnerabilities of the cloud serving platforms, for example due to software bugs resulting in potential data loss and data corruption.

To overcome these problems, the non-patent literature of James Hendricks, Gregory R. Ganger, Michael K. Reiter: "Low-overhead byzantine fault-tolerant-storage", SOSP 2007: 73-86 describes read operations required to return only in contention-free executions to tolerate byzantine readers, meaning that they may fail arbitrarily.

In the non-patent literature of Barbara Liskov, Rodrigo Rodrigues: Tolerating Byzantine Faulty Clients in a Quorum System. ICDCS 2006 digital signatures are used to tolerate byzantine readers.

In the non-patent literature of Amitanand S. Aiyer, Lorenzo Alvisi, Rida A Bazzi: "Bounded Wait-Free Implementation of Optimally Resilient Byzantine Storage Without (Unproven) Cryptographic Assumptions", DISC 2007: 7-19, communication channels are described that eventually deliver every message to all servers, which in asynchronous systems is difficult to implement. Further, the read latency exhibited by the method described therein is linear in the number of servers.

One of the disadvantages is that the above mentioned conventional methods for unauthenticated data are impractical because of high latency, lack of scalability and a lack of progress under contention. Further most of the conventional methods which do not use signatures are optimized for a single writer.

It is therefore an objective of the present invention to provide methods and systems for storing and reading data to or from a key value storage tolerating Byzantine failures in particular by servers and readers.

It is a further objective that the present invention to provide methods and systems for storing and reading data to or from a key value storage which are signature free and provide atomic consistency.

It is an even further objective of the present invention to provide methods and systems for storing and reading data to or from a key value storage which are scalable.

It is an even further objective of the present invention to provide methods and systems for storing and reading data to or from a key value storage reducing the latency for writing and reading data.

It is a further objective of the present invention to provide methods and systems for storing and reading data to or from a key value storage allowing a greater number of servers that may arbitrarily fail.

It is an even further objective of the present invention to provide methods and systems for storing and reading data to or from a key value storage which are more robust than any conventional signature-free method or system.

It is an even further objective of the present invention to provide methods and systems for storing and reading data to or from a key value storage enabling an easy implementation with low costs and with increased flexibility with regard to the data to be read or stored.

According to the invention the aforementioned objectives are accomplished by a method of claim 1.

According to claim 1 the method for storing data in a key value storage having a plurality of n servers, wherein t<n servers may fail arbitrarily and wherein 3t+1=n is satisfied.

According to claim 1 the method is characterized by the steps of a) Generating commitment information for a secret information,
b) Disseminating a first message including the data to be stored, a corresponding key for the data and the generated commitment information to the n servers,
c) Storing the information included in the first message on at least a number of servers,
d) Providing first storing confirmation information by at least n-t servers,
e) Disseminating a second message including corresponding key and the secret information to the n servers,
f) Storing the information included in the second message, and
g) Providing second storing confirmation information by at least n-t servers.

According to the invention the aforementioned objectives are further accomplished by a method of claim 2.

According to claim 2 the method for reading data stored in a key value storage having a plurality of n servers, wherein t<n servers may fail arbitrarily and wherein 3t+1=n is satisfied.

According to claim 2 the method is characterized by the steps of
A) Disseminating a first message including a key corresponding to the data to be read
B) Collecting candidates for the data to be read from at least 2t+1 servers,
C) Writing back secret information corresponding to commitment information and information corresponding to the data to be read,
D) Validating the collected candidates based on a matching of the commitment information and the secret information,
E) Determining candidates for data to be read according to the validated. candidates,
F) Selecting the data to be read based on t+1 reply messages including the same candidate of data to be read and corresponding secret information.

The aforementioned objectives are further accomplished by a system of claim 16.

According to claim 16, the system for storing data in a key value storage having a plurality of n servers, wherein t<n servers may fail arbitrarily and wherein 3t+1=n is satisfied, and a writer for writing data into the key value storage, preferably for performing with a method according to one of the claims 1-15.

According to claim 16 the system is characterized in that the writer is configured to be operable to disseminate a first message including the data to be stored, a corresponding key for the data and a commitment information, generated from a secret information, to the n servers, that
at least a number of servers is configured to be operable to store the information included in the first message, that
the writer is configured to be operable to disseminate a second message including corresponding key and the secret information to the n servers after receiving first storing confirmation information by at least n-t servers, and that
at least n-t servers are configured to be operable to provide second storing confirmation information after storing the information of the second message included in the second message.

The aforementioned objectives are further accomplished by a system according to claim 17.

According to claim 17 the system for reading data stored in a key value storage having a plurality of n servers, wherein t<n servers may fail arbitrarily and wherein 3t+1=n is satisfied, and a reader for data stored in the key value storage, preferably for performing with a method according to one of the claims 1-15.

According to claim 17 the system is characterized in that the reader is configured to be operable to disseminate a first message including a key corresponding to the data to be read, to collect candidates corresponding to the data to be read from at least 2t+1 servers, to write back secret information corresponding to commitment information, generated from the secret information and information corresponding to the data to be read, and to select the data to be read based on t+1 reply messages including the same candidate to be read and corresponding secret information, wherein candidates for the data to be read have been determined according to validated candidates wherein the collected candidates have been validated based on a matching of the commitment information and the secret information.

According to the invention it has first been recognized that the method and the systems according to claims 1, 2, 15 and 16 provide a robust signature-free key value storage with atomic consistency satisfied and with tolerating malicious failures from malicious servers as well as malicious clients, i.e. readers are included.

According to the invention it has further been first recognized that the methods and the systems according to claims 1, 2, 15 and 16 are scalable, i.e. all relevant metrics such as latency, number of messages, message size and storage requirements do not depend on the size of the client's population. There is no upper limit on the number of supported clients according to the present invention. Further readers may be entirely unknown.

According to the invention it has further been first recognized that read latency is significantly reduced and gracefully degraded, i.e. a maximum of two rounds is provided.

According to the invention it is further been first recognized that the methods and the systems according to claims 1, 2, 15 and 16 are lightweight: A computation of secret information and commitment information is inexpensive and does not depend on the value being written. Further secret information and corresponding commitment information can be generated ahead and/or outside the system.

According to the invention it has further been first recognized that the systems and the methods according to claims 1, 2, 15 and 16 are robust: A reader never returns a forged or an obsolete value. Availability is ensured as long as secrecy of the metadata, i.e. commitment information is provided.

According to the invention it has further been first recognized, that the methods and the systems according to claims 1, 2, 15 and 16 do not rely on digital signatures thereby saving computational costs associated with signing and verifying data. Further no public-infrastructure and/or trusted dealers together with associated key management are necessary.

Further features, advantages and preferred embodiments are described in the following subclaims.

According to a preferred embodiment timestamp information is generated and assigned to the data to be stored. By assigning generated timestamp information to the data, the data to be stored from concurrent writers can be easily stored according to the timestamp information ensuring in an easy way atomic consistency: To the data stored a certain timestamp is assigned and when a read operation is performed the read operation returns the data corresponding to the key or newer data.

According to a further preferred embodiment generated timestamp information is globally consistent. For example when the servers are configured to locally assign a globally consistent timestamp to data, an explicit coordination of writers with respect to the timestamp information is not necessary: For example exchanging their timestamp information, i.e. coordinating their local timestamps to obtain consistent timestamp information is not necessary thus saving costs and reducing latency.

According to a further preferred embodiment generated timestamp information is collected before assigning the timestamp information to the data to be stored. This enhances the flexibility, since for example each server may create or generate local timestamp information. The different timestamps are then collected and coordinated by a writer. This enables each server to use its own local timestamp which may be optimized for certain local needs of the different servers.

According to a further preferred embodiment the timestamp information is evaluated before performing step c) and/or f). This enables to provide the most actual data which is stored corresponding to the data with the highest timestamp.

According to a further preferred embodiment a validity of timestamp information is verified, preferably by exchanging at least symmetrically authenticated timestamp information. For example when several writers with unsynchronized clocks update the same key they need to determine the highest timestamp seen by any correct server. For that purpose a writer selects the highest timestamp seen by a server among n-t servers. Malicious servers may reply with a timestamp significantly higher than the last timestamp of any correct server thereby wasting timestamps. To validate the timestamps writers may share a symmetric key only known to the writers and authenticate every timestamp assigned to a value with that key providing verified timestamp information.

According to a further preferred embodiment commitment information is generated by hashing. One of the advantages is, that little additional information needs to be included in messages and generating commitment information is inexpensive. Furthermore the hidden value may be publicly available, enabling a shifting of the verification from the servers to readers for better performance and/or scalability. To generate the commitment information by hashing a one-way function is applied to a random bit string of sufficient length. The commitment information is then used in step b) and the corresponding secret information represented by the random bit string is then disseminated according to step e). The step D) at the correct servers is then triggered by a read operation including a checking whether a writer committed to the secret information received from a reader.

According to a further preferred embodiment commitment information is generated by using a random value and a polynomial value of a random polynomial of degree t applied to the random value. One of the advantages is that the secret information cannot be prematurely constructed from the collective knowledge of malicious parties of at most t shares and the adversary is prevented from constructing partially correct secret information. Partially correct secret information means secret information which is validated by a strict subset of the correct servers. To construct the commitment information a random polynomial P of degree t, which represents secret information, is constructed. Then n commitment information are constructed by picking random values $x_i$—one for each of the n servers—and calculating $P(x_i)$. The commitment for the i-th server consists then of the pair $(x_i, P(x_i))$. The commitment information may then be disseminated according to step b) over secure or authenticated point-to-point channels, ensuring that each commitment information sent to a correct server is known only to the recipients. A writer then sends the polynomial P to all servers according to step e).

If a read operation takes place, the validation according to step D) at a correct server is triggered by the read operation consisting of checking whether the writer committed to a polynomial P', i.e. if the curve describing the polynomial P' associated with a candidate represented by the tuple (k, ts, P') with key k, timestamp ts, and polynomial P' received from the reader contains the point $(x_i, P(x_i))$ taken from the corresponding tuple (k, ts, v, $(x_i, P(x_i))$) received from the writer. Correctness may be ensured by private channels and correct servers must never reveal their shares.

According to a further preferred embodiment commitment information is generated dependent of the servers, preferably for each server a corresponding separate commitment information is generated. This enables to generate local commitment information for each server and enables to provide information-theoretic or unconditional security.

According to a further preferred embodiment secured channels are used for message and/or information exchange, preferably authenticated point-to-point channels. This ensures that if a receiver receives a message from a sender then the sender has sent the message. If the receiver and the sender are both correct then every message sent by the sender eventually is received by the receiver.

According to a further preferred embodiment candidates include stored key and secret information most actually stored and/or most actually received. This enables a simple and fast validation of different candidates with a certain timestamp or younger representing atomic consistency.

According to a further preferred embodiment a union set of all candidates is transmitted in step C). This enables to transmit all candidates with a minimum of information in a message, avoiding that identical candidates are transmitted more then once. A further advantage is, that a validation may be performed either by the servers or subsequent to the servers by readers since all necessary information for validating is transmitted to servers and may be made available by the servers to the readers.

According to a further preferred embodiment a third message including the collected candidates according to step B) and fourth message including validated candidates according to step D) are provided upon receiving the first message. The third message and the fourth message may in particular be provided in one message.

For example a correct server in reply to a first message according to step A) collects candidates for the data to be read according to step B) and further sends validated candidates of the collected candidates. The waiting condition, i.e. receiving t+1 second messages including the same candidate of data to be read and corresponding secret information is then applied to the validated collected candidates according to step D). In order to avoid blocking a reader waits for that waiting condition to be fulfilled only until a pregiven condition, for example an expiry of a local timer, is satisfied. If the read operation in one phase is not successful, the reader may perform the second phase while waiting in a separate thread for completing the first phase. One of the advantages is that the read operation is not affected with regard to latency. In order to avoid a resending of data, servers may also keep track of data, preferably the data tuples already sent to a reader during the first read phase According to a further preferred embodiment, candidates for the data to be read are filtered out upon receiving the fourth message. One of the advantages is that performing a second phase is then not necessary anymore since the readers filter out candidates at the end of the first phase enabling a get or read operation to be completed in the first phase.

There are several ways how to design and further develop the teaching of the present invention in an advantageous way. To this end it is to be referred to the patent claims subordinate to patent claim 1 on the one hand and to the following explanation of preferred embodiments of the invention by way of example, illustrated by the figure on the other hand. In connection with the explanation of the preferred embodiments of the invention by the aid of the figure, generally preferred embodiments and further developments of the teaching will we explained. In the drawing the only

IN THE DRAWINGS

Figure 1:
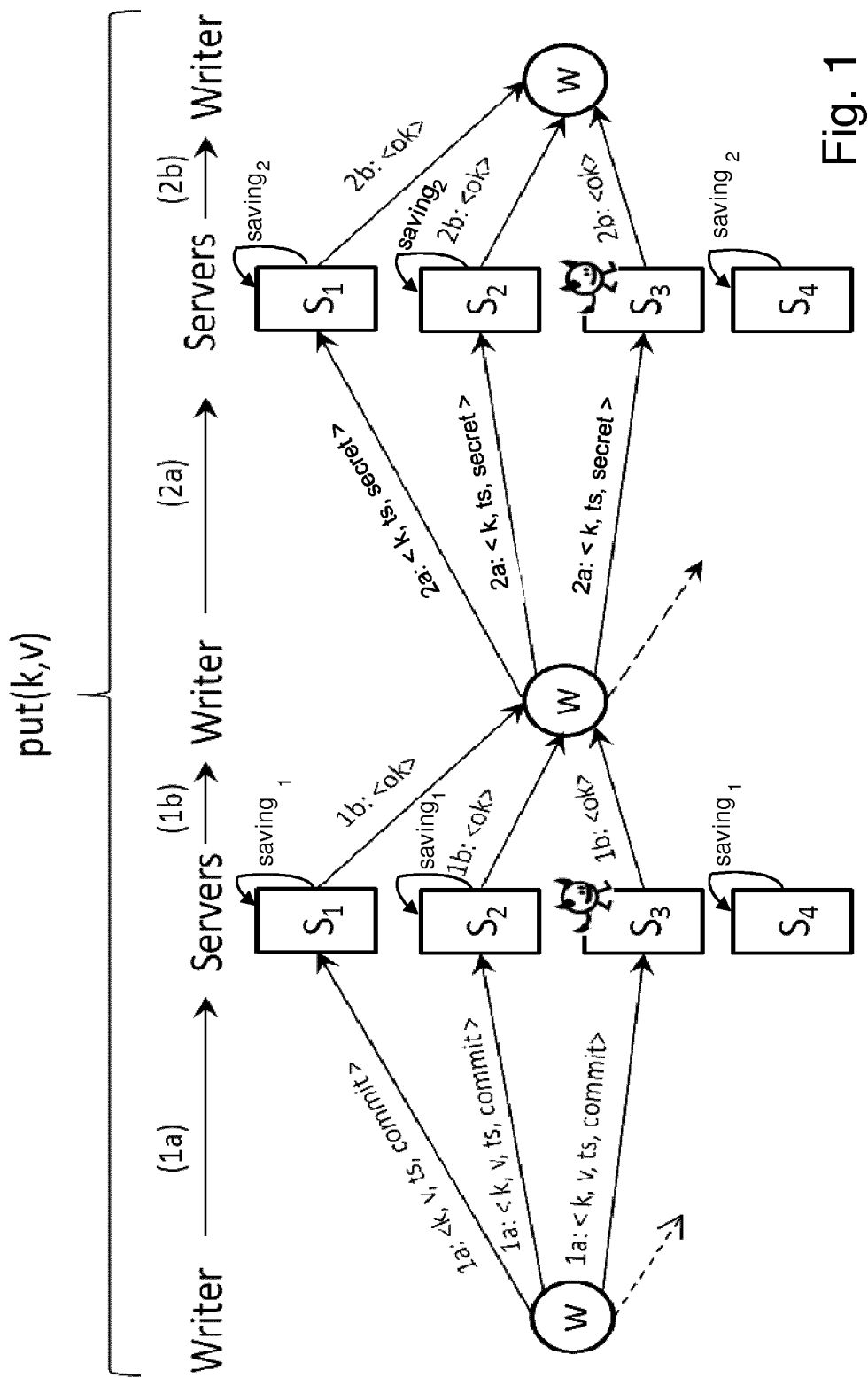
FIG. 1 shows a method for storing data according to an embodiment of the present invention.

In FIG. 1 a writer w performs a put- or write operation put(k, v) for storing a value v under a key k in a key value storage comprising four servers S1-S4 (in total n=4 servers and the number of allowed malicious servers t=1). It is assumed that commitment information commit is already generated according to a provided secret information.

In a first step the writer w disseminates a first message 1a to the servers S1-S4. In the first message 1a the writer w includes the key k, the value v to be stored, a timestamp information ts and the commitment information commit. The writer sends the message to all servers S1-S4 and waits for reply from at least n−t=4−1=3 servers.

When a correct server $S_i$ receives the first message 1a the corresponding server $S_i$ has not received a message with key k, value v, commitment information commit and a timestamp information ts' with ts'>ts then the server $S_i$ stores (reference sign $saving_1$) the information included in the received first message 1a, i.e. the key k, the value v, the timestamp information ts and the commitment information commit. In any case the server $S_i$ replies to the writer w with an acknowledgement message, i.e. an ok-message.

After receiving 4−1=3 ok-messages or replies the writer w reveals the secret information secret by sending another round of messages (second messages, denoted with reference sign 2a) including now the key k, the timestamp ts and the secret information secret corresponding to the commitment information commit. The key k and the timestamp ts relate to the secret information, to the commitment information and to the corresponding value v.

When a correct, i.e. a non-failed or non-malicious server $S_i$ receives the second message 2a including key k, timestamp ts and secret information secret, the server $S_i$ stores ($saving_2$) the tuple <k, ts, secret> unless the server $S_i$ has received a further second message 2a including key k and timestamp information ts' with ts'>ts. In any case the server $S_i$ replies with an ok-message 2b. The put or write operation comprising a first phase with first messages 1a, 1b and a second phase with second messages 2a, 2b is completed when a writer w has received 3 ok-messages 2b.

Under the following assumptions the latency of the right or put operation can be further reduced: The put or right operation by a writer is enabled to be completed in two communication rounds with the servers.

Under the assumptions that a) access to individual keys is sequential, b) the underlying network between writers/readers and servers is synchronous and that c) there are no failures, the following put or write operation may be performed according to the invention. Periods which are represented by synchrony, contention- and failure-freedom are often considered as or called "the common case".

In the common case all correct servers $S_i$ apply the same sequence of updates for the same key k and thus they hold all the same highest timestamp ts. Therefore the servers $S_i$ may locally assign a globally consistent timestamp ts to a value v without explicit coordination by a writer w. The writer may skip the time-stamp collection and assignment phase. The put or read operation is then modified as follows: In the pre-write phase the writer w sends the first message 1a without timestamp ts; the first message 1a includes therefore the key k, the value v and the commitment information commit. The correct server $S_i$ upon receiving the first message 1a increments the highest local timestamp ts to a further higher timestamp value ts'=ts+1 and stores ($saving_1$) the received tuple including key k, value v and commitment information commit with the timestamp ts'=ts+1.

The server $S_i$ then replies to the writer w with a first message 1b including the timestamp information ts'. The writer w then waits until receiving n−t=4−1=3 replies from servers S1-S4 with equal timestamps ts'. The implication is that t+1=2 correct servers have assigned to the value v the same timestamp ts'. In order not to block further put or write operations, the writer w waits only until an expiry of a local timer. In any case the writer w waits to receive replies from n−t=4−1=3 servers. When all replies (first ok-messages 1b) carry the same timestamp ts the writer w proceeds to the write phase by sending a second message 2a including key k, timestamp ts and secret information secret. If all replies 1b include different timestamps the writer w repeats the pre-write phase by sending a further first message 1a' including key k, timestamp ts', value v and commitment information commit with ts'=ts+1 and with timestamp ts representing the highest timestamp received.

Figure 2:
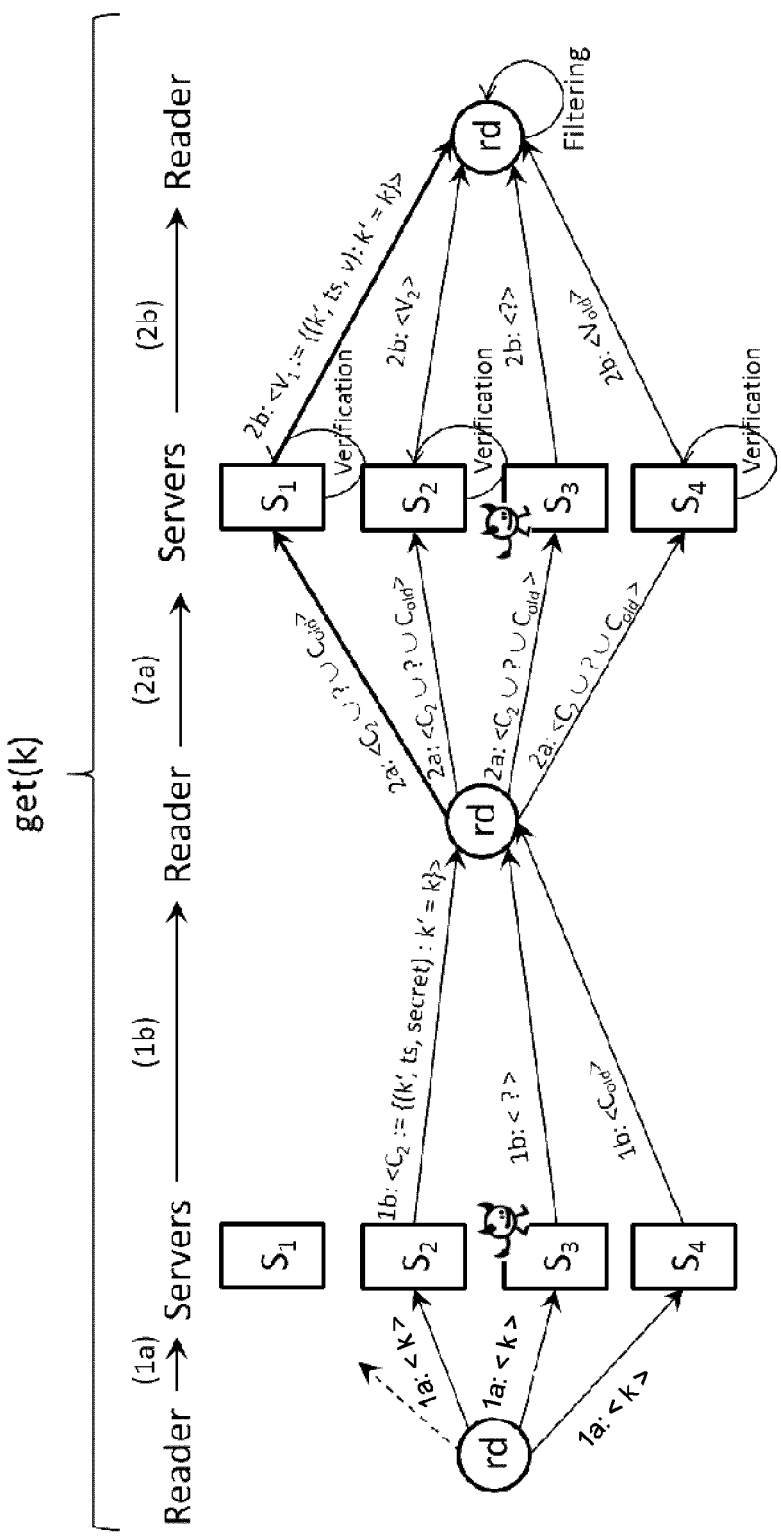
FIG. 2 shows a method for reading data according to an embodiment of the present invention.

FIG. 2 shows a method for reading data according to an embodiment of the present invention.

In a get or read operation a reader rd sends a first message 1a including the key k and waits for replies from n−t=4−1=3 servers. When a correct server $S_i$ receives a first message 1a including the key k from the reader rd then the server $S_i$ constructs a set of candidates $C_i$ comprising the highest time-stamped tuple of key k, timestamp ts and secret information secret received from a previous write-operation and further a set of tuples including key k, timestamp ts' and secret information secret' with ts'>ts received from other and potential malicious readers rd. The server $S_i$ then sends the set $C_i$ in a corresponding first message 1b to the reader rd.

When the reader rd receives first reply messages 1b from 3 servers, then the reader rd sends a second message 2a to all n servers S1-S4 including the union set C of all candidate sets $C_i$. When a correct server $S_i$ receives a corresponding second message 2a including the union set C then the server $S_i$ checks for each tuple including key k, timestamp ts and secret information secret if the corresponding tuple including key k, timestamp ts, value v and commitment information commit has been locally stored on the server $S_i$. If yes the server $S_i$ uses the commitment information commit to validate the secret information secret. The server $S_i$ then constructs a further set $V_i$ of tuples including key k, timestamp ts and value v that have passed the aforementioned validity check. The server $S_i$ sends the set $V_i$ to the reader rd in a second reply message 2b. In a last step the reader rd waits for receiving corresponding reply messages 2b from at least 3 servers. The value v of the validated candidates $V_i$ with the highest timestamp ts is then selected and returned as value v for the get or read operation get(k). A validated candidate V including key k, timestamp ts and secret information secret is valid when t+1 servers reply with second reply messages 2b including key k, timestamp ts and value v. A candidate with key k', timestamp ts', secret information secret' is invalid when n−t=4−3=1 server replies with second reply messages 2b not including key k', timestamp ts', value v'.

In the common case as defined above the get or read operation can also skip the second phase with messages 2a, 2b if the returned candidate represented by the tuple with key k', timestamp ts, secret information secret with k'=k plus the corresponding value included in the validated tuple including key k', timestamp ts, value v with k'=k are gathered in the first phase from n−t=4−1=3 servers in the first phase (represented by the messages 1a and 1b). A correct server $S_i$ in reply to a first message 1a which includes only key k sends or replies back to the reader rd a first reply message 1b and a second reply message 2b. Both reply messages 1b, 2b include the same information as depicted in the messages 1b and 2b of FIG. 2. This separation of the messages is logical and the included data can be sent in a single physical message.

At the reader rd, the waiting condition of the second read phase represented by messages 2a, 2b in FIG. 2) is applied to the messages 1b, 2b received in the first phase. Waiting condition means that the reader rd waits to receive reply messages 1b, 2b from at least n−t=4−1=3 servers.

To avoid a blocking, the reader rd waits for the waiting condition to be fulfilled only until the expiry of a local timer. Further the reader rd may move to the second phase by waiting in a separate thread if reading in one phase is unsuccessful; latency of the get or read operation is thus not affected. To avoid a resending of data servers may keep track of data tuples already sent to reader rd during the first phase.

In summary the present invention provides availability, integrity and atomic consistency: The integrity is satisfied in the following way: If a get or read operation of a key k returns a value v then the value is not fabricated by a Byzantine server. In detail integrity is satisfied because if a get or read operation receives a value v under a key k then t+1 servers have confirmed that the value v has been written. Thus a correct server has stored the value v and therefore v is not forged.

Further the availability is satisfied: A put or write operation of a key k with a value v and a read or get operation of a key k for a value v never block.

Even further atomic consistency is satisfied: If a get or read operation of a key k returns a value v then the value v is written by the last put or write operation with key k and value v preceding a) a get or read operation with the key k or b) a put or write operation concurrent with a get or read operation. If a get or read operation with a key k returns a value v and a later get or read operation with a value k' returns a value v' then the write operation or put operation with key k and value v' does not precede the write or put operation with key k and value v.

In detail atomic consistency is satisfied for the following reasons: If a put or write operation put(k, v) precedes a get or read operation get(k), then the corresponding candidate including key k, timestamp information ts and secret information secret (k, ts, secret) is stored on t+1 correct servers. Since the get or read operation for the key k waits for n−t servers to reply, one of the t+1 correct servers is among the n−t servers (quorum intersection) and replies with candidate (k, ts', secret') with ts'≥ts. Since the server is a correct server, the candidate is never invalidated and eventually becomes valid. Thus atomic consistency is satisfied by returning the associated value v'.

If get or read operations get(k) and get(k)' are read operations by non-malicious readers and if get(k) precedes get(k)' with v, v' be the corresponding values returned and further assumed by contradiction that the write or put operation with key k and value v' precedes the corresponding put or read operation with key k and value v then—since the get(k) operation returns the value v-t+1 servers have vouched for the corresponding candidate including key k, timestamp ts and secret information secret. Thus the pre-write phase represented by the first messages 1a, 1b, is completed. That means that t+1 correct servers have stored the key k, the timestamp information ts, the value v and commitment information commit.

The read operation get(k) has written back the candidate including <k, ts, secret> to t+1 correct servers. Since the other get or read operation get(k)' waits for n−t servers for reply, at least one of them reports the key k, the timestamp ts and the secret information (k, ts, secret) and because of t+1 correct servers have stored (k, ts, v, commit) then the candidate (k, ts, secret) is eventually validated. Since a reader rd always returns the highest timestamped valid candidate and the value v' is assigned to with a lower timestamp ts than v—because the put operation put (k, v') precedes put (k, v)—the get operation get(k)' does not return the value v' in contradiction to the assumption. Therefore atomic consistency is further satisfied.

In summary the present invention provides that if a reader selects a value as a returned candidate, the write operation must have completed the pre-write phase, i.e. the value is stored at a set of t+1 correct servers. A read operation can skip the write back associated with the pre-write phase. The present invention further provides completeness of the pre-write phase: The value is written together with the commitment information to a secret information solely known by a writer. The secret information is revealed by the writer only after completion of the pre-write phase. During a read operation, the commitment information is used to verify the validity of the secret information. If both the validity of the secret information and the value are confirmed by enough servers, i.e. at least t+1, then it is ensured that the value is not forged and the pre-write phase is complete.

According to the present invention one write-back taking a single roundtrip is sufficient. Further the present invention provides that readers write back before determining the actual return candidate. Therefore writing back of a set including the return candidate is sufficient leaving the task of filtering to subsequent reads. Writing back may be performed immediately after collecting all relevant candidates eliminating the need for separate write back phases.

Further the present invention in case of the read operation writes back only metadata, i.e. data about the value but not the value itself, preventing malicious readers from corrupting the stored information in the servers and allowing to tolerate Byzantine readers.

The present invention provides that a secret is committed in a first phase and a secret is revealed in a second phase. During a read operation the commitment information is used to check the validity of the secret information. If a secret information is validated by t+1 servers then the write or put operation has made sufficient progress and the potential candidate may be returned. Otherwise n-t servers invalidate the secret information and the candidate is dropped.

In one embodiment the present invention provides pre-writing values without a timestamp and having servers locally assigned timestamps without explicit coordination. This enables a read operation in a single round. Servers reply to a first message with key k with both messages 1b and 2b just as if they had already received a message 2a from the reader. Readers then have to filter out candidates at the end of the first round.

The present invention provides 1) a robust signature-free atomic key value store tolerating malicious failures. Both, malicious servers and clients (readers) are supported.
2) scalability in the sense that all relevant metrics such as latency, number of messages, message size and storage requirement do not depend on the size of the client population. There is no upper bound on the number of clients. Furthermore, readers may be entirely unknown. Scalability means that the number of messages and message sizes do not depend on the number of clients. Because of the lack of inter-server communication, the number of messages is proportional to the number of servers.
3) optimal and gracefully degrading read latency: one round in the common case (represented by synchrony and contention-freedom on a single key) and two rounds in the worst case. Low latency: The present invention provides the lowest possible latency of the read of two roundtrips.
4) an optimal replication degree 3t+1; the fraction of malicious servers supported cannot be improved. The resulting advantage is evident in a datacenter environment where a large number of data nodes, each holding a share of the date, are replicated for fault-tolerance.
5) computing secrets and commitment in an inexpensive and simple way which do not depend on the value being written. Therefore the metadata can be generated ahead, outside the critical path.
6) guaranteed availability and consistency despite a threshold of malicious servers, any number of client crashes, asynchrony and contention. A reader never returns a forged or an obsolete value and availability is ensured as long as the secrecy of the metadata holds. Thus, the safety of the method and system is always guaranteed (deterministically). The present invention is more robust that any signature-based protocol.

Signature-based storage protocols ensure consistency and integrity only under certain assumption, e.g. secrecy of keys, intractability of solving certain mathematical problems (the hardness of factoring). When these assumptions are violated, also consistency and integrity violated. Consistency and integrity are provided by the present invention. Even with the worst case deviation from the set of assumptions, safety is preserved.

Many modifications and other embodiments of the invention set forth herein will come to mind the one skilled in the art to which the invention pertains having the benefit of the teachings presented in the foregoing description and the associated drawings. Therefore, it is to be understood that the invention is not to be limited to the specific embodiments disclosed and that modifications and other embodiments are intended to be included within the scope of the appended claims. Although specific terms are employed herein, they are used in a generic and descriptive sense only and not for purposes of limitation.

The invention claimed is:

1. A method for storing (put) data (v) in a key value storage having a plurality of n servers ($S_1$, $S_2$, $S_3$, $S_4$), wherein t<n servers ($S_1$, $S_2$, $S_3$, $S_4$) may fail arbitrarily and wherein 3t+1=n is satisfied,
characterized by the steps of
   a) Generating commitment information (commit) for a secret information (secret),
   b) Disseminating a first message (1a) including the data (v) to be stored, a corresponding key (k) for the data (v) and the generated commitment information (commit) to the n servers,
   c) Storing ($saving_1$) the information included in the first message (1a) on at least a number of servers ($S_1$, $S_2$, $S_3$),
   d) Providing first storing confirmation information (1b) by at least n-t servers ($S_1$, $S_2$, $S_3$),
   e) Disseminating a second message (2a) including corresponding key (k) and the secret information (secret) to the n servers ($S_1$, $S_2$, $S_3$, $S_4$),
   f) Storing ($saving_2$) the information included in the second message (2a), and
   g) Providing second storing confirmation information (2b) by at least n-t servers ($S_1$, $S_2$, $S_3$).

2. A method for reading (get) data (v) stored in a key value storage having a plurality of n servers ($S_1$, $S_2$, $S_3$, $S_4$), wherein t<n servers ($S_1$, $S_2$, $S_3$, $S_4$) may fail arbitrarily and wherein 3t+1=n is satisfied,
characterized by the steps of
   A) Disseminating a first message (1a) including a key (k) corresponding to the data (v) to be read
   B) Collecting (1b) candidates ($C_2$, $C_i$, $C_{old}$) for the data (v) to be read from at least 2t+1 servers ($S_2$, $S_3$, $S_4$),
   C) Writing back (2a) secret information (secret) corresponding to commitment information (commit) and information corresponding to the data (v) to be read,
   D) Validating (verification) the collected candidates ($C_2$, $C_i$, $C_{old}$) based on a matching of the commitment information (commit) and the secret information (secret),
   E) Determining candidates for data (v) to be read according to the validated candidates ($V_i$)
   F) Selecting the data to be read based on t+1 reply messages (2b) including the same candidate of data (v) to be read and corresponding secret information (secret).

3. The method according to claim 1, characterized in that timestamp information (ts) is generated and assigned to the data (v) to be stored.

4. The method according to claim 1, characterized in that generated timestamp information (ts) is globally consistent.

5. The method according to claim 1, characterized in that before assigning the timestamp information (ts) to the data (v) to be stored, generated timestamp information (ts) is collected.

6. The method according to claim 1, characterized in that before performing step c) and/or step f) the timestamp information (ts) is evaluated.

7. The method according to claim 1, characterized in that a validity of timestamp information (ts) is verified, preferably by exchanging at least symmetrically authenticated timestamp information.

8. The method according to claim 1 7, characterized in that commitment information (commit) is generated by hashing.

9. The method according to claim 1 8, characterized in that commitment information (commit) is generated by using a random value ($x_i$) and a polynomial value of a random polynomial (P) of degree t applied to the random value ($x_i$).

10. The method according to claim 9, characterized in that the commitment information (commit) is server dependent ($S_1$, $S_2$, $S_3$, $S_4$), preferably for each server ($S_1$, $S_2$, $S_3$, $S_4$) a corresponding separate commitment information (commit) is generated.

11. The method according to claim 1, characterized in that secure channels are used for message and/or information exchange, preferably authenticated point-to-point channels.

12. The method according to claim 2, characterized in that candidates ($C_2$, $C_i$, $C_{old}$) include stored key (k) and secret information (secret) most actually stored and/or most actually received.

13. The method according to claim 2, characterized in that a union set (C) of all candidates ($C_2$, $C_i$, $C_{old}$) is transmitted in step C).

14. The method according to claim 2, characterized in that a third message including the collected candidates ($C_2$, $C_i$, $C_{old}$) according to step B) and a forth message including validated candidates ($V_1$, $V_2$, $V_{old}$) according to step D) are provided upon receiving the first message (1a).

15. The method according to claim 14, characterized in that candidates for the data (v) to be read are filtered out upon receiving the forth message.

16. A system for storing data (v) in a key value storage having a plurality of n servers ($S_1$, $S_2$, $S_3$, $S_4$) wherein t<n servers may fail arbitrarily and wherein 3t+1=n is satisfied, and a writer (w) for writing data (v) into the key value storage, preferably for performing with a method according to claim 1, characterized in that the writer (w) is configured to be operable to disseminate a first message ($1_a$) including the data (v) to be stored, a corresponding key (k) for the data (v) and a commitment information (commit), generated from a secret information (secret), to the n servers ($S_1$, $S_2$, $S_3$, $S_4$), that at least a number of servers ($S_1$, $S_2$, $S_3$, $S_4$) is configured to be operable to store the information included in the first message (1a), that the writer (w) is configured to be operable to disseminate a second message (2a) including corresponding key (k) and the secret information (secret) to the n servers ($S_1$, $S_2$, $S_3$, $S_4$) after receiving first storing confirmation information (1b) by at least n-t servers ($S_1$, $S_2$, $S_3$, $S_4$) and that at least n-t servers ($S_1$, $S_2$, $S_3$, $S_4$) are configured to be operable to provide second storing confirmation information (2b) after storing the information of the second message (2a) included in the second message (2a).

17. A system for reading data stored in a key value storage having a plurality of n servers, wherein t<n servers ($S_1$, $S_2$, $S_3$, $S_4$) may fail arbitrarily and wherein 3t+1=n is satisfied, and a reader (rd) for data (v) stored in the key value storage, preferably for performing with a method according to claim 1, characterized in that the reader (rd) is configured to be operable to disseminate a first message (1a) including a key (k) corresponding to the data (v) to be read, to collect candidates ($C_2$, $C_i$, $C_{old}$) corresponding to the data (v) to be read from at least 2t+1 servers ($S_1$, $S_2$, $S_3$, $S_4$), to write back secret information (secret) corresponding to commitment information (commit), generated from the secret information (secret) and information corresponding to the data (v) to be read, and to select the data (v) to be read based on t+1 reply messages ($C_2$, $C_i$, $C_{old}$) including the same candidate ($C_2$, $C_i$, $C_{old}$) to be read and corresponding secret information (secret), wherein candidates ($C_2$, $C_i$, $C_{old}$) for the data (v) to be read have been determined according to validated candidates ($V_i$) wherein the collected candidates ($C_2$, $C_i$, $C_{old}$) have been validated based on a matching of the commitment information (commit) and the secret information (secret).

\* \* \* \* \*